(12) United States Patent
Cedilnik

(10) Patent No.: US 7,202,944 B2
(45) Date of Patent: Apr. 10, 2007

(54) DETERMINING MEASURING UNCERTAINTY OR ERROR OF A PDL-TESTER

(75) Inventor: Gregor Cedilnik, Gaeufelden (DE)

(73) Assignee: Agilent Technologies, Inc., Paol Alto, CA (US)

( * ) Notice: Subject to any disclaimer, the term of this patent is extended or adjusted under 35 U.S.C. 154(b) by 51 days.

(21) Appl. No.: 10/503,285

(22) PCT Filed: Jul. 16, 2002

(86) PCT No.: PCT/EP02/07869

§ 371 (c)(1),
(2), (4) Date: Apr. 20, 2005

(87) PCT Pub. No.: WO03/078956

PCT Pub. Date: Sep. 25, 2003

(65) Prior Publication Data

US 2005/0174562 A1 Aug. 11, 2005

(30) Foreign Application Priority Data

Feb. 28, 2002 (EP) .................................. 02004701

(51) Int. Cl.
*G01N 21/00* (2006.01)

(52) U.S. Cl. ..................................................... 356/73.1
(58) Field of Classification Search ..................... None
See application file for complete search history.

(56) References Cited

U.S. PATENT DOCUMENTS 5,371,597 A * 12/1994 Favin et al. ................. 356/367
6,211,957 B1 * 4/2001 Erdogan et al. ............. 356/364
6,449,033 B2 * 9/2002 Marro et al. ................ 356/73.1

FOREIGN PATENT DOCUMENTS

EP 0 605 116 6/1994

* cited by examiner

*Primary Examiner*—Tu T. Nguyen

(57) ABSTRACT

Determining a measuring uncertainty and/or maximum measuring error of a polarization dependent loss—PDL—tester for determining a PDL value of a device under test—DUT—is provided by using the PDL tester for determining a value of PDL of a verification element having an actual value of PDL greater than a maximum value of a specified measuring range, wherein the PDL tester has an expected measuring uncertainty and/or expected maximum measuring error. The measuring uncertainty and/or maximum measuring error or the tester is then derived from the determined value of PDL of the verification element in conjunction with the actual value of PDL of the verification element.

13 Claims, 3 Drawing Sheets

DETERMINING MEASURING UNCERTAINTY OR ERROR OF A PDL-TESTER

This application is the National Stage of International Application No. PCT/EP02/07869, International Filing Date, Jul. 16, 2002, which designated the United States of America, and which international application was published under PCT Article 21(2) as WO Publication No. WO 03/078956 A1 and which claims priority from European Application No. EP 02004701.5, filed Feb. 28, 2002.

BACKGROUND OF THE INVENTION

1. Field of the Invention

The present invention relates to determining a measurinq uncertainty or error of a tester for polarization dependent loss (PDL).

2. Brief Description of Related Developments

PDL is usually understood as the difference between maximum and minimum loss (normally in dB) of a device under test (DUT) when changing the polarization of a light beam sent through the DUT. PDL testers are testing or measuring devices adapted to measure or determine the PDL of the DUT. The specification of the PDL tester represents the measurement uncertainty of the tester for a given PDL of the DUT. To verify the specification of the PDL tester, normally a reference device (so-called golden device) with known value of PDL is used.

SUMMARY OF THE INVENTION

It is an object of the invention to provide improved determining of measuring uncertainty or error of a tester for PDL. The object is solved by the independent claims. Preferred embodiments are shown by the dependent claims.

For the sake of avoiding repetitions, the term 'PDL' as used in the following is usually to be understood as a value of PDL, if not otherwise clear from the context. Accordingly, the term tester is usually to be understood as PDL tester.

An advantage of preferred embodiments of the present invention is the possibility to avoid the necessity to use costly reference devices having a precisely defined and precisely known PDL as verification elements, so called "golden devices". Therefore, the small but existing uncertainty of such reference devices worsening the system specification of the tester can be avoided.

Preferred embodiments of the invention allow using standard connectors to connect the verification element e.g. to a seat of the tester. Such standard connectors have the disadvantage in the prior art that they show an amount of PDL, which gives additional uncertainty to the system specification of the tester. Thus, e.g. expensive and time consuming splicing of the fiber at the connecting sites of the tester to avoid the PDL of connectors can be omitted following the preferred embodiments.

In preferred embodiments of the invention, simply the PDL measurement on a verification element with high PDL, here also called polarizer, with the tester is sufficient to provide measurement results which can be used to evaluate an upper limit for the error or measurement uncertainty of the tester for a given DUT having a given amount of PDL.

In case the PDL of the verification element is sufficiently high with respect to the measuring range of the PDL tester, the actual PDL of the verification element needs not be precisely known and can be assumed to be infinite. It is sufficient if the actual PDL of the verification element is much higher than the maximum PDL of the specified measuring range of the tester. Preferably, the actual PDL of the verification element is selected to be higher than a maximum meaningful or specified value of the PDL to be measured by the tester. It is preferred to use verification elements having at least 10 dB, preferred at least 20 dB, more preferred at least 30 dB of PDL. Because of the high PDL of the inventive verification element, the PDL e.g. of the connectors play no role any more.

The error or measurement uncertainty of the tester might depend on the orientation of the DUT (i.e. on the polarization vectors of the DUT for maximum and minimum transmission). This can be covered by repeatedly measuring with the tester the polarizer under different orientations and/or with different positions and loops of the polarizer patch cord and/or with different polarizers (e.g. with polarizers with different vectors for maximum/minimum transmission), so that the polarizer orientation changes with respect to the polarization of the source. The worst case measured polarizer PDL, e.g. the lowest PDL result, can then be taken for evaluation of the estimated worst possible tester measurement error.

In one embodiment, an approximation of the error or measurement uncertainty of the tester is achieved, as described in more detail below, by using the formula:

$$E_{nom} \propto PDL_{nom} - 10 \cdot \log\left(\frac{10^{PDL_{nom}/10} + 10^{-PDL_{pol,m}/10}}{1 + 10^{(PDL_{nom}-PDL_{pol,m})/10}}\right) \quad \text{eq. 1}$$

for the evaluation of the maximum possible error of the tester, with $PDL_{nom}$ being the nominal value of the PDL in dB of a device under test (DUT) to be measured, $PDL_{pol,m}$ being the PDL in dB of the verification element measured by the tester (the minimum value in case of repeated measurements) and $E_{nom}$ being the upper limit for the maximum possible measurement error in dB of the tester at the nominal PDL of the DUT.

In another embodiment the following simplified formula:

$$E_{nom} \propto 10 \cdot \log\left(\frac{10^{PDL_{nom}/10} + 10^{PDL_{pol,m}/10}}{10^{-PDL_{nom}/10} + 10^{PDL_{pol,m}/10}}\right) \quad \text{eq. 2}$$

using the same variables is applied instead of equation 1.

The invention can give lower errors for the test results of the tester without changing the tester, because the verification is performed more precisely with the help of the invention since connector PDL and changes of polarizer PDL do less or not contribute to the test uncertainty.

In a preferred embodiment of the invention there is provided a zero device (e.g., a simple standard single mode fiber patch cord) to measure the intrinsic PDL of the tester or deficiencies of the tester that act like intrinsic PDL, e.g. power meter noise, light source power fluctuation, connector PDL, power meter PDL etc. The total uncertainty of the tester is composed by the uncertainty derived from the polarizer test and from the intrinsic PDL of the tester.

Finally, it is possible in preferred embodiments to make the verification of the tester in transmission and in reflection. Preferably, the verification with the polarizer as the inventive verification element is done only in transmission since the results can be used for the evaluation of the specification of reflection, also. Alternatively or additionally the verification can be performed in reflection using a reflective verification element with high PDL (reflective polarizer). However, both in transmission and in reflection the measurement with the zero device is preferred. The transmission zero device can simply be a patch cord, the reflection zero device can be a reflector.

It is clear that the invention can be partly embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF THE INVENTION

Figure 1:
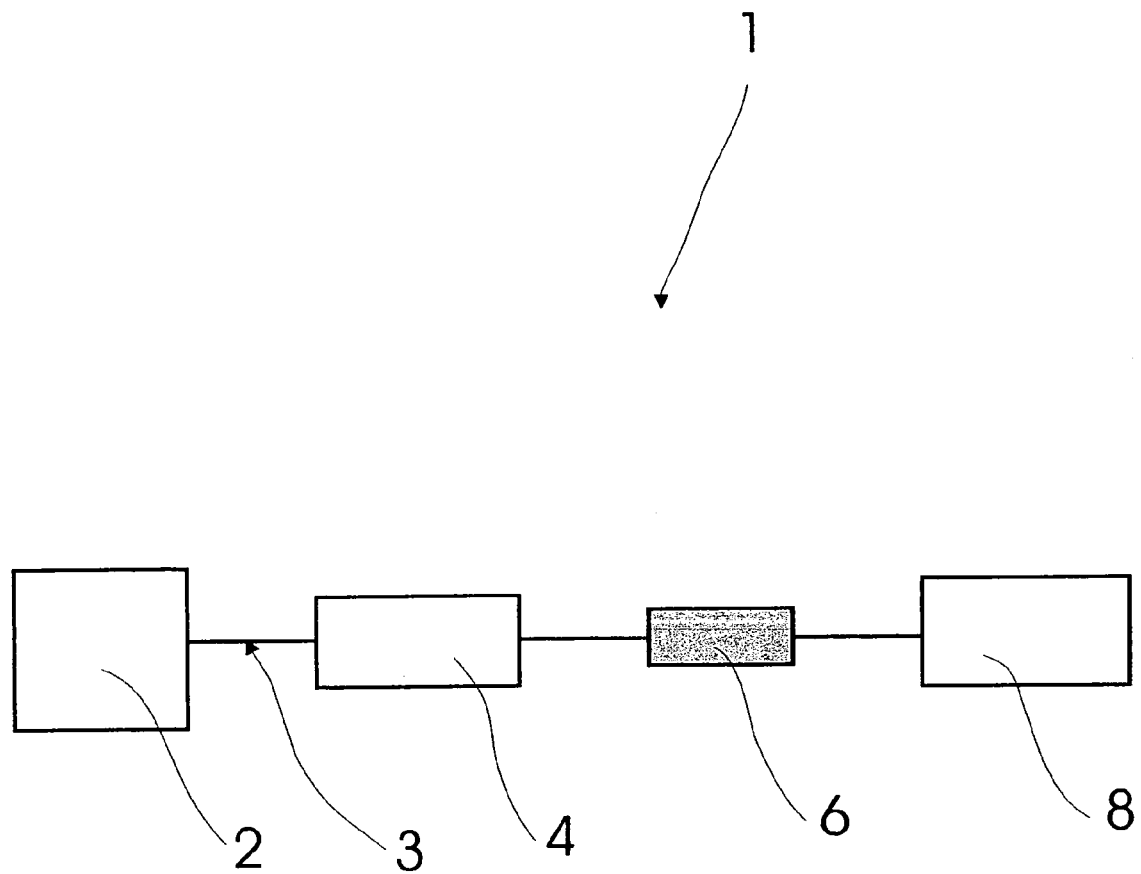
FIG. 1 shows a schematic illustration of an embodiment of the invention.

In FIG. 1, an embodiment 1 shows a light source 2 which provides a polarized light beam 3 to a polarization controller 4 which provides e.g. four polarization states to the beam 3 (e.g. for the Mueller-Stokes method) or multiple polarization states (e.g. for the polarization scanning method, where the maximum/minimum loss is searched by continuously or step-like changing the polarization). The accordingly polarized beam 3 is then provided to a verification element 6 in a (not shown) seat of apparatus 1 for PDL measurements.

The verification element 6 having a polarizing feature replaces a DUT. The polarizing feature of the verification element 6 is a relatively high PDL compared to the PDL of the DUT to be measured with setup 1. E.g. the verification element 6 used in setup 1 has a PDL which is ten times higher than the PDL to be measured with the tester 1, i.e. in the shown embodiment the PDL of the verification element 6 is at least 30 dB. It is important to notice that the PDL of the verification element 6 needs not be known exactly. It is sufficient to have a minimum actual PDL of the verification element 6 over all relevant parameters like time, temperature, wavelength. Therefore, it is sufficient for the shown setup that it is known that the verification element 6 of the present embodiment has a minimum PDL of 30 dB. It is also possible to use a verification element with a lower actual PDL, e.g. with a PDL of 18 dB, but this can result in more pessimistic (=higher) estimations of the tester PDL measurement uncertainty.

Having a verification element 6 with such a great PDL it is easily possible to make the contact between the verification element 6 and the tester with normal connectors (not shown) since the additional PDL uncertainty of such plugs in a range of approximately 20 mdB can be neglected. Therefore, expensive splicing of the "not shown" fiber for beam 3 is not necessary. Also because the PDL of the verification element 6 does not have to been known precisely, no aging or temperature problems arise. Finally, the verification element 6 according to the present invention is low cost (typically less then one tenth) with respect to a so-called "golden" device as a reference device used in the prior art.

A preferred embodiment of the inventive method works as follows:

In this embodiment a zero measurement is performed first of all. By this intrinsic PDL effects are covered, e.g. noise of the power meter 8, light source power fluctuations, PDL of internal connectors of the tester, power meter PDL. The zero measurement is performed e.g. by introducing a (not shown) patch cord into the seat of the tester instead of the verification element 6. Alternatively, it is possible to perform the zero measurement by just connecting two connectors of the seat directly with each other.

Having performed the zero measurement a PDL measurement is performed with the verification element 6 in the seat of the tester by a polarizer measurement. This polarizer measurement gives information about imperfection of the different polarization states, e.g. polarization controller errors, quasi-unpolarized background from source spontaneous emission (SSE) of a laser and further unknown contributions, since these contributions scale with the PDL of a DUT to be measured with tester 1.

Having measured the PDL of the verification element 6, the maximal possible error of the tester 1 is derived by using the aforementioned equation 1 for the evaluation of the maximum possible error of the tester 1, with $PDL_{nom}$ being the nominal value of the PDL in dB of the DUT, $PDL_{pol,m}$ being the PDL in dB of the verification element 6 measured by the tester 1 (the minimum value in case of repeated measurements), and $E_{nom}$ being the upper limit for the maximum possible measurement error in dB of the tester 1 at the nominal PDL of the DUT. Instead, the simplified formula of equation 2 can be used accordingly.

Alternatively or additionally the formula $$U_{rel} \propto 1 - \frac{10^{PDL_{pol,m}/10} - 1}{10^{PDL_{pol,m}/10} + 1} \qquad \text{eq. 3}$$

can be used for the evaluation of the maximum possible relative measurement error of the tester with respect to the PDL of a DUT to be measured in dB, $PDL_{pol,m}$ being the PDL in dB of the verification element measured by the tester (e.g. the minimum value in case of repeated measurements). This is at least valid in the linear regime as described later in description of FIG. 3. $U_{rel}$ might be "2%" for example.

The formulas are based on the Mueller-Stokes method as described e.g. in "Dennis Derickson, Fiber Optic, Test and Measurement, Prentice-Hall, Inc., Upper Saddle River, N.J. 07458, USA, 1998, pages 232–234 and 356–358"and the following described error model:

The Mueller-Stokes method for PDL measurement is based on loss measurement at four defined polarization states of the incident light 3 that are orthogonal on the Poincaré-Sphere. The measurement result error or uncertainty depends on the linearity of the power meter 8 (inclusive noise) and the perfection of the polarization states (inclusive power stability of the source 2). Additional uncertainties are known to result from the PDL of the systems components (e.g. connectors, coupler, power meter 8 etc.). From the four loss results the polarization dependent loss of the verification element 6 can be evaluated. The four different polarization states are introduced in the system by-the polarization controller 4 which provides four different polarization states SOP 1, SOP 2, SOP 3, SOP 4 e.g. horizontal polarization, vertical polarization, diagonal polarization, circular polarization.

Deviation from orthogonality results in a PDL measurement error according to the following explanation: when comparing two nominal orthogonal polarization states ("1" and "2"), e.g. like "horizontal" and "vertical", state "2" can be separated in a part orthogonal to "1" and one part parallel to it. A loss measurement in state "2" therefore results in a resulting loss that is composed by a part orthogonal to "1" and a part parallel to "1". The latter leads to PDL measurement error. The same is valid for example for an unpolarized contribution.

The PDL measurement uncertainty can be estimated by measuring a perfect polarizer (PDL=∞). If the polarizer is in such position that state "1" is maximum transmission, the transmission in state "2" would be ideally zero, the actually measured transmission gives a measure for the PDL measurement error.

E.g. by "moving" the cable between polarization controller 4 and polarizer (generally: by making an orthogonal transformation of the polarization state at the polarizer input), and performing a new PDL measurement, the worst case measurement error for DUTs of different orientation of the polarization eigen vectors can be found. The eigen vectors are the states of polarization with maximum or minimum loss.

For example the worst case (i.e. lowest) PDL result measured by the system under test for the used verification element or polarizer can be used for evaluation (other possibilities: a statistical worst case result calculated from a series of measurements is used. Further variation: not the PDL result is used for evaluation, but the derived ratio of maximum and minimum transmission of the polarizer (which is related to the PDL value)).

Furthermore, the tester 1 can be designed to measure PDL in reflection, also. For this purpose a (not shown) coupler is installed between polarization controller 4 and the seat for the verification element 6. Then the same PDL measurements can be done as in transmission, either by scanning with a motorized polarization scrambler (i.e. an apparatus able to modify the polarization of the transmitted beam) or by providing four different polarization states with a polarization controller 4 for Mueller-Stokes analysis. Connected to the coupler is an additional second (not shown) power meter for measuring the loss values of the verification element 6 for the given polarizations in reflection. However, it is not necessary to perform the measurement of the verification element 6 in reflection. Instead it is only necessary to have a zero measurement in reflection. This is because the way between the light source 2 and the seat for the DUT is the same in transmission and in reflection, so that imperfections of the polarization states have the same effect in transmission and in reflection. Thus the results of the polarizer measurements in transmission can be used for reflection, also.

To perform the zero measurement in reflection there is used a reflector positioned in the seat instead of the verification element 6. The intrinsic PDL derived from the zero measurement increases the measurement uncertainty of the tester. Both contributions are added in s suitable way (e.g. arithmetically or by root-sum-square).

Figure 2:
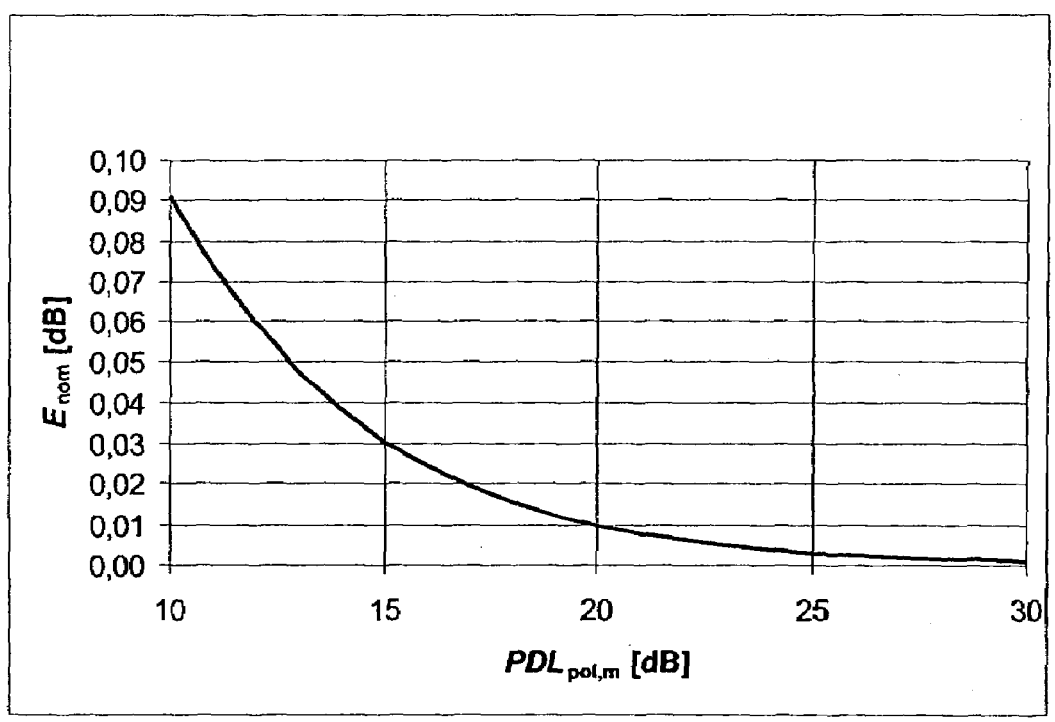
FIGS. 2, 3 show graphic illustrations of the invention.

FIG. 2 shows a graph displaying the minimum measured polarizer PDL "$PDL_{pol,m}$" on the x axis and the calculated tester measurement uncertainty "$E_{nom}$" on the y axis with a nominal PDL "$PDL_{nom}$" of a DUT to be tested assumed to be 0.5 dB as example. The curve shows that the uncertainty "$E_{nom}$" is getting smaller when the measured PDL "$PDL_{pol,m}$" of the verification element 6 is enlarged. As a minimum value of the actual PDL "$PDL_{pol,m}$" of the verification element 6 it should be chosen a value which is greater than the targeted PDL "$PDL_{nom}$" of the DUT to be measured. Preferably, it should be chosen a value that corresponds (according to the given formulas and FIG. 2) to a resulting uncertainty "$E_{nom}$" that is smaller than the uncertainty for which the tester is designed for. In embodiment 1 the PDL "$PDL_{pol,m}$" of the verification element 6 is chosen to be 30 dB corresponding to the uncertainty +0.001 dB being smaller than the targeted tester PDL uncertainty of e.g. ±0.01 dB.

Figure 3:
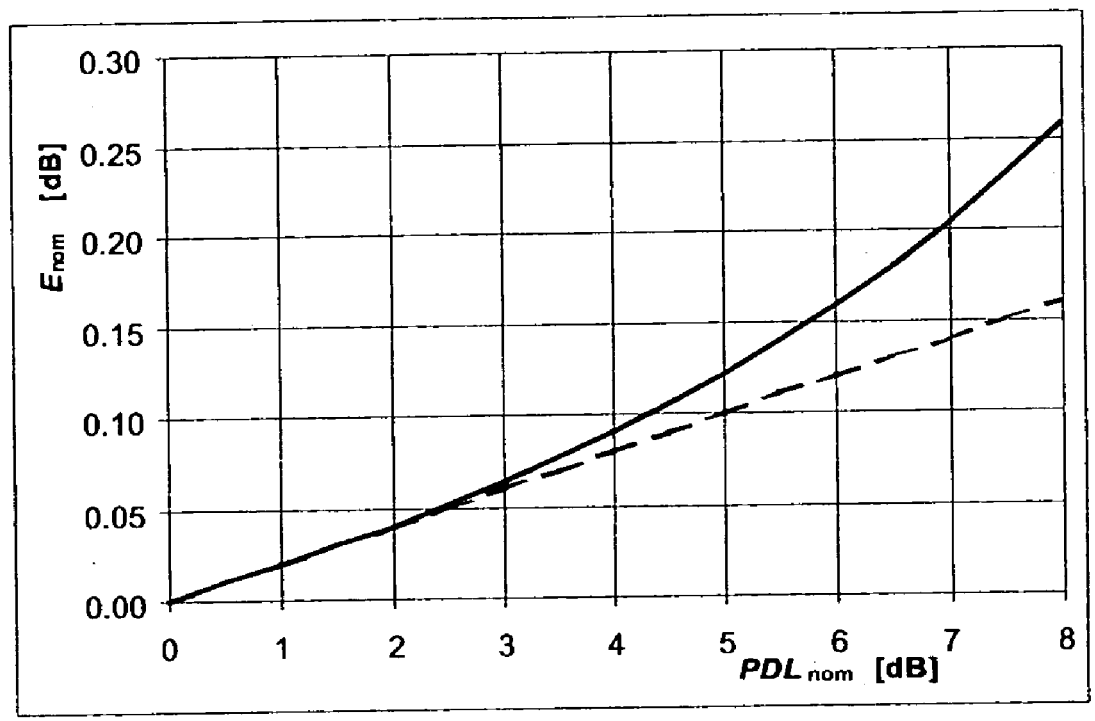

FIG. 3 shows a graph showing nominal PDL "$PDL_{nom}$" of a DUT to be tested on the x axis and the calculated expected tester uncertainty "$E_{nom}$" for a system with minimum measured-polarizer PDL "$PDL_{pol,m}$" of the verification element 6 being 20 dB. The upper solid line shows the uncertainty "$E_{nom}$" calculated according to the above-mentioned formula. The lower broken line shows an asymptote of the calculated uncertainty "$E_{nom}$" being a linear approximation of the upper curve. It can be seen that the linear approximation has a slope of 2%. Therefore, for example, the relative uncertainty of 2% can be used as the specification of the tester 1 when the nominal PDL "$PDL_{nom}$" of the DUTs to be tested is in the "linear regime", here between 0 and 2 dB.

What is claimed is:

1. A method of determining a measuring uncertainty maximum measuring error of a polarization dependent loss—PDL—tester adapted for determining a PDL value of a device under test—DUT—, comprising the steps of:
   (a) using the PDL tester for determining a value of PDL of a verification element having an actual value of PDL greater than a maximum value of a specified measuring range, wherein the PDL tester has an expected measuring uncertainty or expected maximum measuring error, and
   (b) deriving the measuring uncertainty or maximum measuring error of the tester from the determined value of PDL of the verification element in conjunction with the actual value of PDL of the verification element.

2. The method of claim 1, wherein the actual value of PDL of the verification element is at least one of the following: at least ten times greater than the maximum value of the specified measuring range of the PDL tester, or at least 10 dB.

3. The method of claim 1, wherein step b comprises a step of approximating the measuring uncertainty or maximum measuring error of the tester by at least one of:
   using the determined value of PDL of the verification element in conjunction with the actual value of PDL of the verification element, and
   using the determined value of PDL of the verification element and assuming the actual value of PDL of the verification element to be infinite.

4. The method of claim 1, further comprising the steps of:
   repeating the determination step a at least one time with at least one of the following measures:
   using a different orientation of the verification element,
   using a different verification element,
   using a different position of at least one device or component in a transmission path of a light beam provided to the verification element for determining its value of PDL, performing a polarization transformation before the verification element, using at least one of a polarization scrambler, a faraday rotator, and a retarder plate provided in the transmission path before the verification element;

determining a lowest value of the determined values of PDL in step a by applying a statistic determination, and using the determined lowest value of PDL as the determined value of PDL of the verification element in step b.

5. The method of claim 1, wherein in step a, the value of PDL of the verification element is determined in at least one of transmission and reflection.

6. The method of claim 1, further comprising the steps of:

(c) using the PDL tester for determining a zero value of PDL of a zero element having an actual value of PDL approximately zero, and (d) deriving a zero measuring uncertainty or zero measuring error of the tester from the determined zero value of PDL of the zero element.

7. The method of claim 6, further comprising the steps of:

repeating the determination step c at least one time with at least one of the following measures:

using a different orientation of the verification element, using a different zero element, using a different position of at least one device or component in a transmission path of a light beam provided to the zero element for determining its value of PDL, performing a polarization transformation before the zero element using at least one of a polarization scrambler, a faraday rotator, and a retarder plate provided in the transmission path before the zero element;

determining a highest value of the determined values of PDL in step c by applying a statistic determination, and using the determined highest value of PDL as the determined value of PDL of the zero element in step d.

8. The method of claim 6, further comprising a step of deriving a total measuring uncertainty or total maximum measuring error of the tester from the measuring uncertainty or maximum measuring error of the tester as derived in step a in conjunction with the zero measuring uncertainty or zero measuring error of the tester as derived in step c.

9. The method of claim 1, wherein the step b comprises a step of deriving a value of $E_{nom}$, as the measuring uncertainty or maximum measuring error of the tester at a value $PDL_{nom}$ as the PDL of a device under test—DUT—to be measured by the tester, using the following formula:

$$E_{nom} \propto PDL_{nom} - 10 \cdot \log\left(\frac{10^{PDL_{nom}/10} + 10^{-PDL_{pol,m}/10}}{1 + 10^{(PDL_{nom}-PDL_{pol,m})/10}}\right),$$

with $PDL_{pol,m}$ being the value of PDL of the verification element as determined in step a.

10. The method of claim 1, wherein the step b comprises a step of deriving a value of $U_{rel}$, as a relative measuring uncertainty or relative measuring error of the tester at a value $PDL_{nom}$ as the PDL of a device under test—DUT—to be measured by the tester, using the following:

$$U_{rel} \propto 1 - \frac{10^{PDL_{pol,m}/10} - 1}{10^{PDL_{pol,m}/10} + 1},$$

with $PDL_{pol,m}$ being the value of PDL of the verification element as determined in step a.

11. A software program or product stored on a computer readable medium, for executing the method of claim 1, when run on a data processing system such as a computer.

12. An apparatus adapted for determining a measuring uncertainty or maximum measuring error of a PDL tester that is adapted for determining a PDL value of a device under test—DUT—, comprising:

a receiver adapted for receiving from the PDL tester a value of PDL of a verification element having an actual value of PDL greater than a maximum value of a specified measuring range, wherein the PDL tester has an expected measuring uncertainty or expected maximum measuring error, and an evaluating unit adapted for deriving the measuring uncertainty or maximum measuring error of the tester from the determined value of PDL of the verification element in conjunction with the actual value of PDL of the verification element.

13. An apparatus for determining a measuring uncertainty or maximum measuring error of a PDL tester adapted for determining a PDL value of a device under test—DUT—, comprising:

a verification element having an actual value of PDL greater than a maximum value of a specified measuring range, wherein the PDL tester has an expected measuring uncertainty or expected maximum measuring error, and an evaluating unit adapted for determining a value of PDL of the verification element and for deriving the measuring uncertainty or maximum measuring error of the tester from the determined value of PDL of the verification element in conjunction with the actual value of PDL of the verification element.

* * * * *